United States Patent [19]
Jenkins et al.

[11] Patent Number: 4,961,285
[45] Date of Patent: Oct. 9, 1990

[54] PLANT IRRIGATION SYSTEM

[76] Inventors: Wayne Jenkins, 12959 Pennypacker La., #9; Richard Marx, 1068 Larch Way, both of West Palm Beach, Fla. 33414

[21] Appl. No.: 312,607

[22] Filed: Feb. 17, 1989

Related U.S. Application Data

[63] Continuation-in-part of Ser. No. 870,849, Jun. 5, 1986, Pat. No. 4,805,342.

[51] Int. Cl.$^5$ .............................. A01G 27/00
[52] U.S. Cl. ........................................ 47/79
[58] Field of Search ............... 47/48.5, 79, 59, 62, 47/60, 63

[56] References Cited

U.S. PATENT DOCUMENTS

| | | | |
|---|---|---|---|
| 63,335 | 3/1867 | Tice . | |
| 1,231,976 | 3/1917 | Weitzel | 47/79 |
| 2,241,699 | 5/1941 | Cooper | 47/62 |
| 2,278,991 | 4/1942 | Hasslacher et al. | 47/79 X |
| 2,306,027 | 12/1942 | Swaney | 47/79 |
| 2,870,574 | 1/1959 | Sheridan | 47/1.2 |
| 3,168,797 | 2/1965 | Patassy | 47/38 |
| 3,384,987 | 5/1968 | Prechtl | 248/DIG. 9 |
| 3,664,626 | 5/1972 | Sneller | 248/214 |
| 4,040,436 | 8/1977 | Caldwell | 47/79 X |
| 4,056,899 | 11/1977 | Close | 47/79 |
| 4,057,933 | 11/1977 | Enyeart | 47/62 X |
| 4,070,794 | 1/1978 | Gibbs | 47/79 |
| 4,115,951 | 9/1978 | Becker et al. | 47/48.5 X |
| 4,149,340 | 4/1979 | Davitoria-Lobo | 47/79 |
| 4,175,354 | 11/1979 | Anderson | 47/79 X |
| 4,183,176 | 1/1980 | Barfield | 47/79 |
| 4,198,784 | 4/1980 | Sukert | 47/79 |
| 4,265,050 | 5/1981 | Buescher | 47/79 |
| 4,281,625 | 8/1981 | Kasai | 119/77 |
| 4,300,309 | 11/1981 | Mincy | 47/48.5 |
| 4,332,105 | 6/1982 | Nir | 47/79 |
| 4,335,540 | 6/1982 | Allen | 47/79 |
| 4,447,983 | 5/1984 | Shinada | 47/79 X |
| 4,475,626 | 10/1984 | Gleich | 182/150 |
| 4,527,353 | 7/1985 | Newby | 47/59 |
| 4,542,762 | 9/1985 | Littlehale | 137/78 |

FOREIGN PATENT DOCUMENTS

WO81/01940  7/1981  PCT Int'l Appl. ............ 47/62

Primary Examiner—Mickey Yu
Attorney, Agent, or Firm—Eckert, Seamans, Cherin & Mellott

[57] ABSTRACT

Plant irrigation apparatus is provided with a reservoir. Water is placed inside the reservoir filling a portion of its volume. A pressurized gas is also introduced into the reservoir. The water is forced by the gas pressure out of the reservoir through at least one outlet conduit communicating with the water in the reservoir. Water leaves the outlet conduits through at least one discharge outlet. The apparatus can include structure for hanging the apparatus from a plant grow pot. Gas pressurization apparatus is utilized to provide a substantially constant supply of pressurized gas in the reservoir.

13 Claims, 3 Drawing Sheets

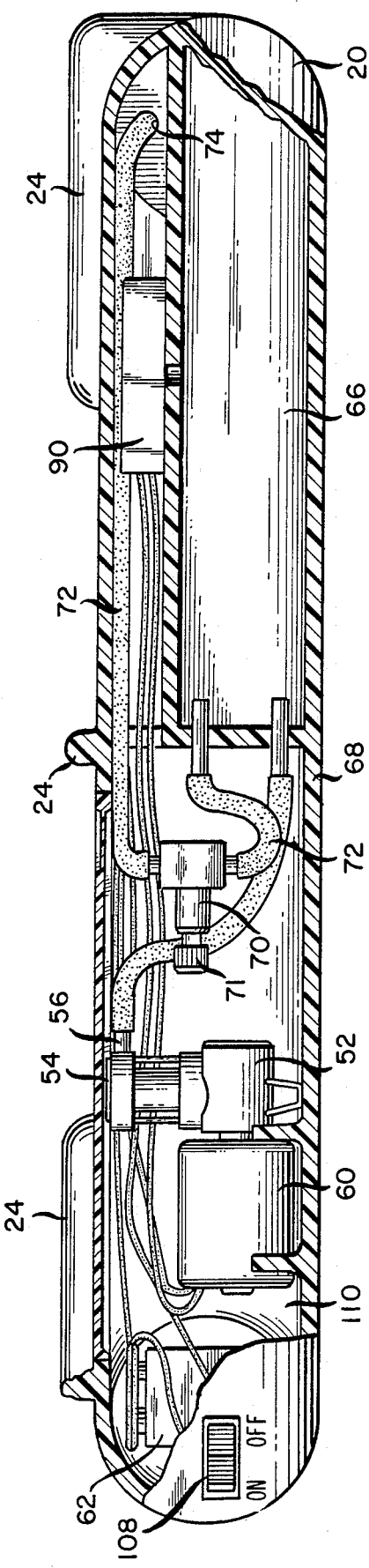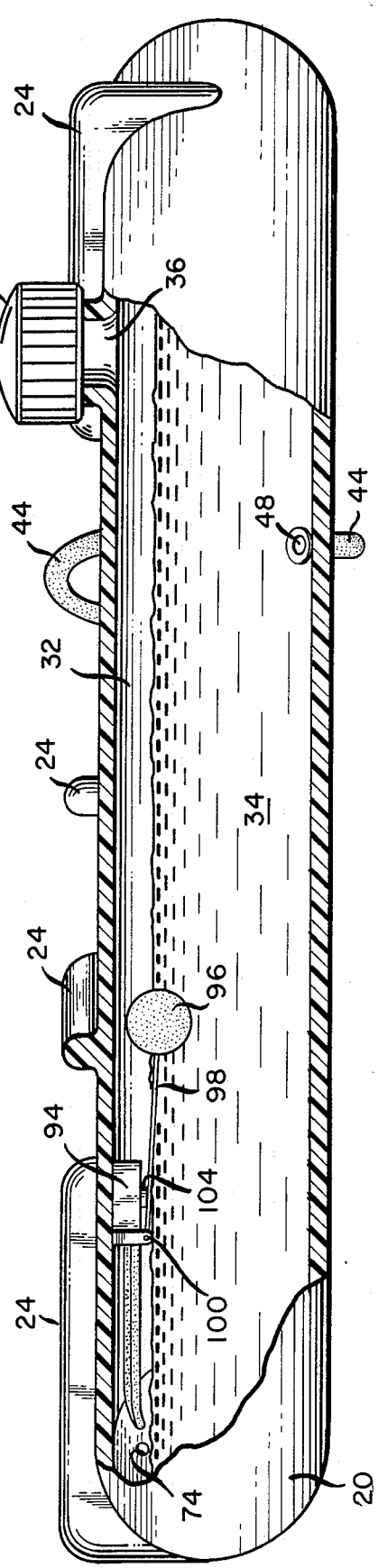

PLANT IRRIGATION SYSTEM

CROSS REFERENCE TO RELATED APPLICATION

This application is a continuation-in-part of Applicants co-pending U. S. Patent Application Ser. No. 870,849, filed June 5, 1986, to be issued as U.S. Pat. No. 4,805,342.

BACKGROUND OF THE INVENTION

1. Field of the Invention

This invention relates generally to plant watering apparatus, and more particularly to self contained, refillable plant watering apparatus.

2. Description of the Prior Art

Regular plant watering is necessary for proper care of the plant. The usual practice is to water the plant at regular intervals. This method produces large variations in the amount of water in the soil. A good deal of manual labor is required to repeatedly water large numbers of plants, as in commercial settings.

A number of inventions have been directed to automatic plant watering systems. These systems are usually bulky and unsightly, and therefore are particularly undesirable in commercial decorative settings. A number of gravity fed automatic plant waterers are available. It is necessary however to place the water reservoir above the level of the soil. The reservoir is then usually partially or fully in view. It would be desirable to provide a plant watering system which would remain out of the view of observers of the plant. It would also be desirable to provide a plant watering system which would supply water to the plant at an essentially constant rate and which could be utilized as an add-on to existing plant grow pots. The moisture content of the soil could then be continuously maintained at or near the optimal level for the particular plant. It would be desirable to provide a plant watering apparatus which is not expensive to own and operate, and thus ideal for the commercial setting, and which could be utilized as an add-on to existing plant grow pots. It would also be desirable to provide a plant watering apparatus which could be operated by relatively inexperienced workers.

Some plant watering devices provide a water reservoir below the grow pot and in contact with the soil. The water travels upward by a capillary attraction through the soil to the plant. All soils do not have the same ability to transfer water in this manner, and an insufficient supply of water may result. It would be desirable to provide a plant watering apparatus which will therefore supply water to the plant regardless of the type of soil in the grow pot.

SUMMARY OF THE INVENTION

It is an object of the invention to provide a plant watering apparatus which will operate continuously yet remain out of view.

It is another object of the invention to provide a plant watering apparatus which can continuously deliver a liquid stream to an altitude above that of the liquid reservoir.

It is yet another object of the invention to provide a plant watering apparatus which is capable of maintaining the moisture level in the soil at a substantially constant level.

It is another object of the invention to provide a plant watering apparatus which can be operated by relatively inexperienced workers.

It is still another object of the invention to provide a plant watering apparatus which is relatively inexpensive to manufacture.

It is another object to the invention to provide a plant watering apparatus which is relatively inexpensive to operate.

It is yet another object of the invention to provide a plant watering apparatus which is capable of supplying nutrients to the plant soil.

It is still another object of the invention to provide a plant watering apparatus which can be hung from the side of the plant grow pot.

These and other objects are accomplished by plant watering apparatus in which a reservoir is provided to hold a supply of water. The structure through which the water enters the reservoir is preferably hermetically sealed. A pressurized gas is introduced into the reservoir through suitable structure which does not permit the escape of gas. The gas pressure forces the water out of the reservoir through at least one outlet conduit. The outlet conduits have associated therewith at least one discharge outlet, which may be of capillary dimensions and through which the water may escape to the plant soil.

The outlet conduits are preferably in the form of tubes which communicate with the interior of the reservoir at or near its bottom. The tubes extend over the rim of the grow pot such that the discharge outlet is positioned over or in the soil in the grow pot. Gas pressure in the reservoir permits the delivery of water to a point above the surface of the water in the reservoir. The reservoir may then be positioned alongside the grow pot, as between the side wall of the grow pot and a decorative outer container. In this manner the reservoir is substantially out of view.

The reservoir is periodically replenished with liquid. The reservoir may include structure for indicating when the proper amount of water is in the reservoir. Additional structure may be provided for indicating when a proper gas pressure is present in the reservoir.

Gas pressure in the reservoir is preferably maintained by a gas compressor which draws ambient air through an inlet an air inlet. The gas compressor is in fluid communication with the liquid reservoir, and supplies the liquid reservoir with a substantially constant gas pressure which results in a substantially constant gas flow of water from the reservoir. An intermediate gas accumulation tank can be provided to store pressurized gas and thereby prevent pressure fluctuations and excessive cycling of the gas compressor. A battery for the compressor can be supplied to make the unit completely portable.

A switch for the air compressor is responsive to sensed pressure, preferably in the gas tank. The switch is closed, and the compressor is "on", when the pressure falls below a set point minimum. The switch is open, and the compressor is 'off', when the pressure in the tank rises above a set point maximum. A separate switch can be provided in the liquid reservoir to shut off the air compressor when the liquid level falls below a set point minimum so as to prevent operation of the compressor when all of the liquid has been discharged from the reservoir.

Structure can be provided for conveniently hanging the reservoir from the side of a grow pot. This structure may include a hanger affixed to the reservoir which engages the side of the grow pot. The hanger may have a hook portion at its distal end which slips over the side of the grow pot.

BRIEF DESCRIPTION OF THE DRAWINGS

There are shown in the drawings embodiments which are presently preferred it being understood, however, that the invention is not limited to the precise arrangements and instrumentalities shown, wherein:

FIG. 3 is a side elevation taken along line 3-3 in FIG. 2, and partially broken away to depict internal features.

FIG. 4 is a side elevation taken along line 4-4 in FIG. 2, and partially broken away to depict internal features.

DETAILED DESCRIPTION OF THE PREFERRED EMBODIMENTS

Figure 1:
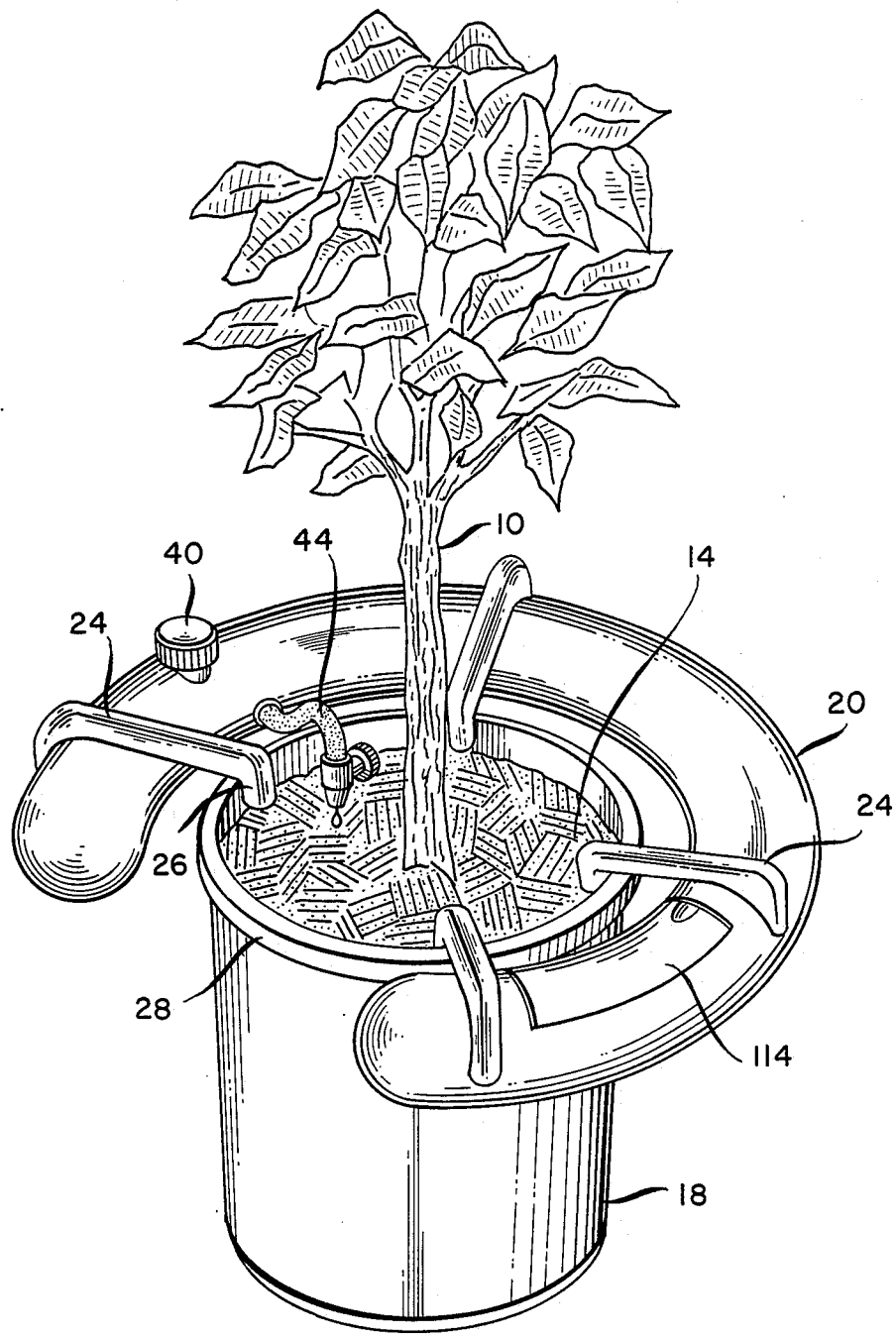
FIG. 1 is a perspective view of a plant watering apparatus according to the invention.
Figure 2:
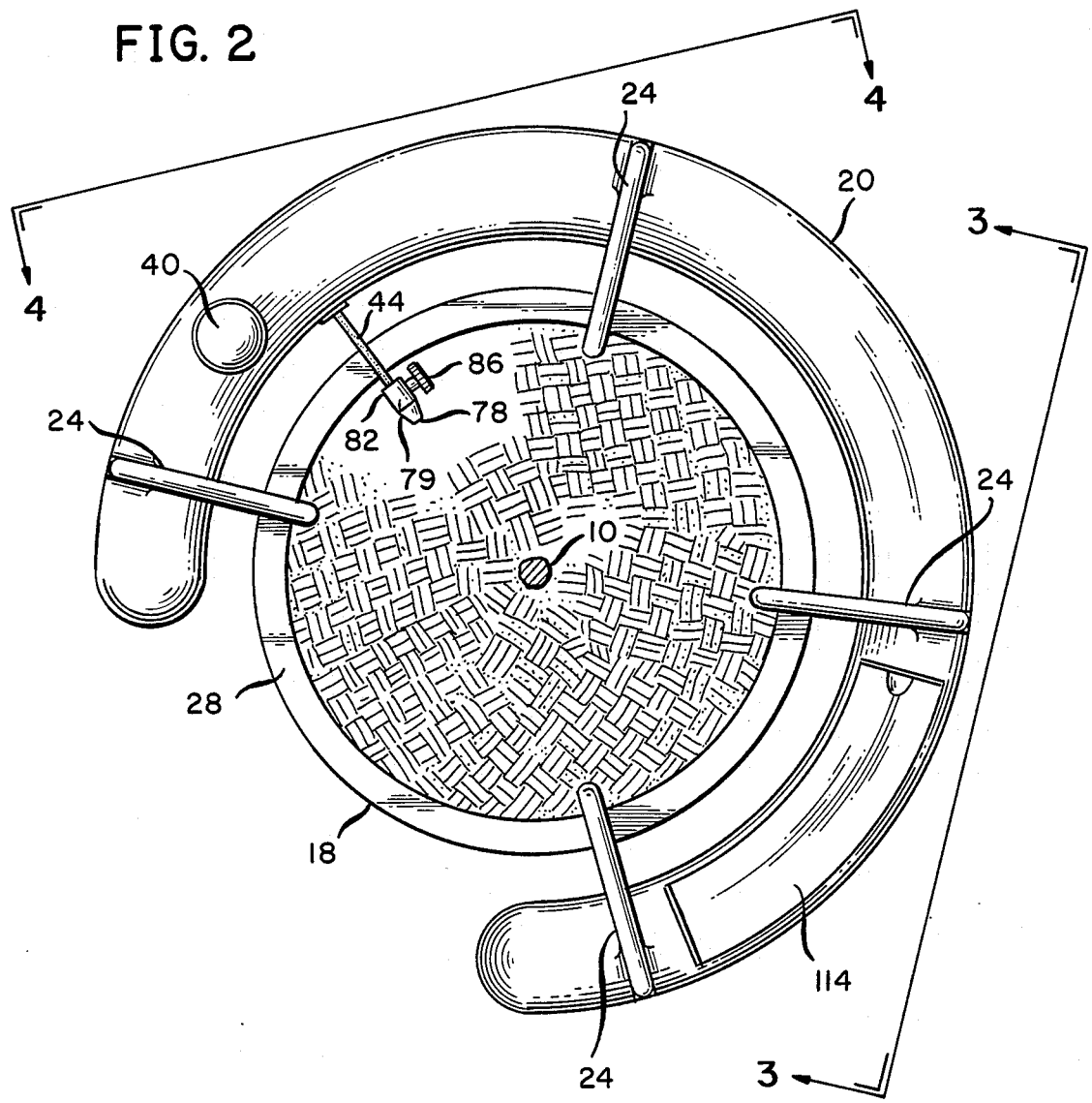
FIG. 2 is a plan view.

A plant watering apparatus, as shown in FIGS. 1-4 includes several features from Applicant's co-pending United States Patent Application Ser. No. 870,849, to be U.S. Pat. No. 4,805,342. The disclosure of this application and patent are herein incorporated fully by reference. The invention provides an apparatus which will supply a plant 10 with water at a substantially constant rate over an extended period of time. The plant 10 is typically potted in soil 14 contained by a suitable grow pot structure 18. The invention provides a housing 20 which can be supported alongside the grow pot 18. This can be accomplished by the hangers 24 which have downwardly opening hook portions 26 adapted to engage a top edge 28 of the grow pot 18.

A closed liquid reservoir 32 can be provided in the housing 20 and includes a means for introducing a liquid 34 into the liquid reservoir 32. The liquid is usually water, but can also be other liquids and solutions necessary or helpful to plant growth. An opening 36 can be formed through which liquid can be introduced into the liquid reservoir 32. A suitable neck structure 38 can extend outwardly from the opening 36 so as to provide a seat for closure structure such as the cap 40. The cap 40 can engage the neck 38 by any suitable means, including cooperating threading, but preferably should form a substantially hermetic seal of the opening 36.

At least one outlet conduit 44 communicates with the liquid reservoir 32 through an outlet opening 48. The outlet opening 48 will normally be positioned substantially at the bottom of the liquid reservoir 32 so as to provide for a more complete discharge of liquid 34.

A pressurization means is provided to apply a gas pressure to the liquid reservoir 32. The gas pressurization means could comprise a bottled compressed gas, although a preferred structure is the gas compressor 52 which receives air through a gas inlet 54 and releases the air at a gas outlet 56. One or more openings can be provided in the housing 20 if necessary to allow an adequate air flow into the compressor 52. The compressor 52 is powered by a motor 60 which can receive energy from a suitable source, such as an electrical outlet. It is preferable, however, to provide a battery 62 which can be mounted within the housing 20 so as to make the apparatus completely portable.

A gas accumulation tank 66 is preferably also provided for a more constant gas pressure and to avoid excessive cycling of the compressor 52. Gas is transferred from the gas outlet 56 of the compressor 52 to the tank 66 by a suitable gas transfer conduit 72. Gas exits the tank 66 through a second gas transfer conduit 68, and is passed to the liquid reservoir 32 through an inlet opening 74. The pressurized gas applies a pressure to the liquid 34 in the liquid reservoir 32, which pressure forces the liquid through the outlet opening 48 and discharge conduit 44.

A pressure regulator 70 can be provided between the gas storage tank 66 and the liquid reservoir 32, as in the second gas transfer conduit 72, to reduce the pressure of the gas reaching the liquid reservoir 32 to a desired value. An adjustment knob 71 can be utilized to increase or decrease the pressure reaching the liquid reservoir 32, as desired. It will be understood that an increased gas pressure will generally lead to an increased liquid flow rate through the discharge conduit 44, and that a decreased pressure will result in a decreased liquid flow rate. A presently preferred pressure is between about one-half PSIG and about three-fourths PSIG.

Structure is preferably provided for regulating the flow of liquid through the discharge conduit 44. This structure can include one or more discharge openings 78 which can be formed in various small dimensions to prevent the rapid release of water. The discharge openings can be formed in the sides of the conduit 44 or in a suitable nozzle 79 as shown. One suitable method of forming the discharge openings 78 would be to use laser technology to create very small and precise discharge openings. Additionally, regulating structure such as a needle valve 82 can be provided, flow through which can be controlled by an adjustment knob 86.

Structure is preferably provided to avoid excessive operation of the air compressor 52. A gas pressure sensor switch 90 is adapted to sense gas pressure in the system, preferably in the tank 66, and to open and switch off operation of the compressor 52 when the pressure has risen to a set point maximum. The switch 90 is adapted to close, and to actuate the compressor 52, when the pressure has fallen to a set point minimum. These set points can vary depending on the particular dimensions and flow rates which are required, although a set point minimum of about 5 PSIG and a set point maximum of about 30 PSIG are presently preferred.

A liquid level switch, here the float switch 94, is provided in the reservoir 32 to prevent excessive cycling of the compressor 52 in the event that all of the liquid is discharged from the reservoir 32. The float switch 94 includes a float 96 connected to an actuating arm 98 at a pivotal connection 100. The arm 98 is adapted to make contact with a switch member 104 whenever the level of the liquid 34 in the reservoir 32 is above a minimum value. This closes the switch 94 to permit operation of the compressor 52. The switch member 104 is biased against the arm 98, and when the level of the liquid 34 falls below the set point minimum, the switch member 104 is extended to a position where the float switch 94 is opened and operation of the compressor 52 is prevented. This will prevent excessive cycling of the compressor 52 whenever the liquid 34 has been substantially discharged from the reservoir 32.

Figure 5:
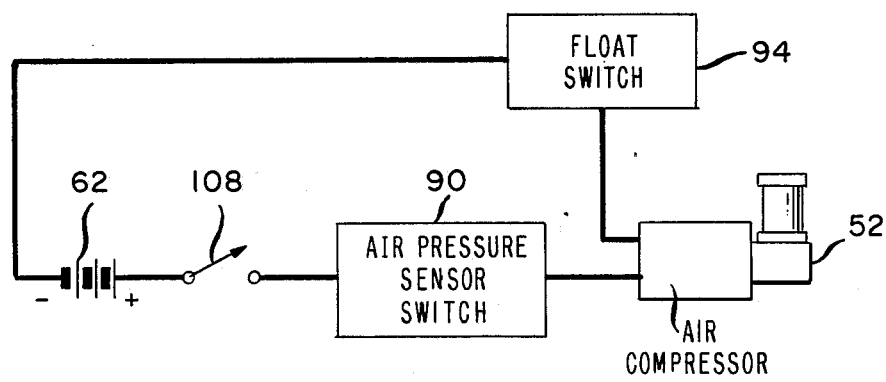
FIG. 5 is schematic diagram of a wiring system according to the invention.

The control of the compressor 52 by the gas pressure sensor switch 90 and the float switch 94 is more easily understood with reference to the circuit diagram in FIG. 5. The compressor 52, battery 62, gas pressure sensor switch 90, and float switch 94 can be conveniently provided in a simple series circuit. An open condition in either the gas pressure sensor switch 90 or the float switch 94 opens the series circuit and prevents operation of the compressor 52. A simple manual switch, such as the switch 108, can be provided to permit manual shutdown of the system.

Suitable components for the invention can be selected from several that are currently available. The air compressor can be a Model 70, manufactured by the Marbuchi Company, Hong Kong. A suitable air pressure sensor switch is the 20D10 manufactured by Airlogic in Racine, Wis. A preferred pressure regulator is RSM-OO-LOO manufactured by the Wilkerson Company of Denver, Colo. The battery is selected primarily to suit the requirements of the compressor motor, and a 6-volt battery is presently preferred.

The housing 20 can be formed from any suitable material, although high-density plastics are presently preferred for their strength and resistance to corrosion.

The housing 20 can be provided in several alternative forms, although the semi-circular construction shown in the figures is preferred. This form permits a wrap-around engagement to the plant grow pot 18, and can easily be molded into separate liquid reservoir and gas tank compartments. A compressor compartment 110 can also be formed in the housing 20 to contain the compressor 52, motor 60, battery 62, pressure regulator 70, and various conduits and wiring. A removable cover 114 can be provided to permit access to the compressor compartment 100, especially to change the battery 62.

This invention can be embodied in several alternative forms without departing from the spirit or essential attributes thereof, and accordingly, reference should be made to the following claims, rather than to the foregoing specification, as indicating the scope of the invention.

We claim:

1. A plant-watering apparatus for providing liquid to a plant at a substantially constant rate, comprising:
   a housing;
   means for attaching the housing to the side of a plant grow pot;
   a closed liquid reservoir within said housing;
   means for introducing liquid into said liquid reservoir;
   gas pressurization means within said housing for generating a pressurized gas, and having gas outlet means;
   gas accumulation tank means within said housing, said gas accumulation tank means having gas inlet means and gas outlet means, said gas inlet means of said gas accumulation tank means being in fluid communication with said gas outlet means of said gas pressurization means, said gas outlet means of said gas accumulation tank means being in fluid communication with said liquid reservoir; and,
   discharge conduit means communicating with said liquid reservoir and extending outwardly and upwardly from said liquid reservoir, whereby said apparatus will deliver liquid under the pressure of said pressurized gas to a location above said liquid reservoir, and whereby said liquid can flow into said plant grow pot.

2. The plant-watering apparatus of claim 1, wherein said conduit means comprises means for regulating flow of liquid through said discharge conduit.

3. The plant-watering apparatus of claim 1, wherein said gas pressurization means comprises gas inlet means in said housing adapted to supply said gas pressurization means with ambient air.

4. The plant-watering apparatus of claim 1, wherein said gas pressurization means comprises a gas compressor.

5. The plant-watering apparatus of claim 4, wherein said gas compressor is electrically operated, and further comrpsing battery means for said compressor.

6. The plant-watering apparatus of claim 1, further comprising gas pressure sensor switch means adapted to sense gas pressure and to shut off the operation of said gas pressurization means when said gas pressure rises to a set point maximum, and being adapted to turn on said compressor when said gas pressure falls to a set point minimum, whereby a relatively constant pressure will be maintained in said liquid reservoir.

7. The plant-watering apparatus of claim 6, wherein said sensor switch means is adapted to sense pressure in said gas accumulation tank means.

8. The plant-watering apparatus of claim 6, further comprising pressure regulating means adapted to control gas pressure in said liquid reservoir.

9. The plant-watering apparatus of claim 8, wherein said gas pressure regulating means is positioned in the gas flow path between said gas accumulation tank means and said liquid reservoir.

10. The plant-watering apparatus of claim 8, further comprising liquid level switch means adapted to sense the level of liquid in said liquid reservoir, and to cease the operation of said gas pressurization means when said liquid level has reached a set point minimum.

11. The plant-watering apparatus of claim 1, wherein said discharge conduit comprises nozzle means adapted to restrict the rate of discharge of water from said discharge conduit to said plant.

12. The plant-watering apparatus of claim 1, wherein the means for introducing a liquid into said liquid reservoir includes at least one opening in the liquid reservoir closeable by cap means.

13. The plant-watering apparatus of claim 1, wherein said means for attaching the housing to a plant grow pot comprises a hanger with a downwardly-opening hook portion adapted to engage the plant grow pot.

* * * * *